United States Patent
Badiei

(10) Patent No.: US 10,801,719 B2
(45) Date of Patent: Oct. 13, 2020

(54) BUBBLING FLUIDIZED BED COMBUSTION DEVICE AND METHOD FOR MONITORING THE FLUIDIZED BED IN SUCH A COMBUSTION DEVICE

(71) Applicant: VATTENFALL AB, Stockholm (SE)

(72) Inventor: Shahriar Badiei, Gävle (SE)

(73) Assignee: VATTENFALL AB, Stockholm (SE)

( * ) Notice: Subject to any disclaimer, the term of this patent is extended or adjusted under 35 U.S.C. 154(b) by 175 days.

(21) Appl. No.: 15/560,705

(22) PCT Filed: Mar. 23, 2016

(86) PCT No.: PCT/SE2016/050242
§ 371 (c)(1),
(2) Date: Sep. 22, 2017

(87) PCT Pub. No.: WO2016/153419
PCT Pub. Date: Sep. 29, 2016

(65) Prior Publication Data
US 2018/0106475 A1    Apr. 19, 2018

(30) Foreign Application Priority Data

Mar. 25, 2015    (SE) ...................... 1550364

(51) Int. Cl.
*F23C 10/30*    (2006.01)
*F23N 5/24*    (2006.01)
*G01F 23/284*    (2006.01)

(52) U.S. Cl.
CPC .............. *F23C 10/30* (2013.01); *F23N 5/242* (2013.01); *G01F 23/284* (2013.01); *F23N 2223/06* (2020.01); *F23N 2225/02* (2020.01)

(58) Field of Classification Search
None
See application file for complete search history.

(56) References Cited

U.S. PATENT DOCUMENTS 4,400,150 A * 8/1983 Smith ................... B01J 8/1818
                                                         110/245
5,337,289 A    8/1994 Fasching et al.
(Continued)

FOREIGN PATENT DOCUMENTS

EP    0305875 A2    3/1989
JP    S57175902 A    10/1982
(Continued)

OTHER PUBLICATIONS

Bartels et al., Agglomeration in fluidized beds at high temperatures: Mechanisms, detection and prevention, Prog. Energy Combustion Sci., 34(5):633-66 (2008).

(Continued)

*Primary Examiner* — Matthew D Krcha
(74) *Attorney, Agent, or Firm* — Marshall, Gerstein & Borun LLP

(57) ABSTRACT

A bubbling fluidized bed combustion device (1) comprising a fluidization vessel (2), a fluidized sand bed (3) arranged in the fluidization vessel and an arrangement for monitoring the fluidized sand bed. The arrangement comprises at least one radar level gauge (4) arranged to repeatedly measure a distance (D) in the fluidization vessel from a reference point (5) to at least one portion (6) of the top surface of (7) the fluidized sand bed, and to provide a measurement signal (S) representative of the distance. The invention also relates to a method for monitoring a fluidized bed in a bubbling fluidized bed combustion device.

21 Claims, 2 Drawing Sheets

(56) References Cited

U.S. PATENT DOCUMENTS 6,460,412 B1 * 10/2002 Cai .................. B01J 8/1809
73/290 V
2014/0305357 A1 10/2014 DeSellem et al.

FOREIGN PATENT DOCUMENTS

| | | |
|---|---|---|
| JP | 2003207382 A | 7/2003 |
| JP | 2004144391 A | 5/2004 |
| KR | 10-2007-0045297 A | 5/2007 |
| WO | WO-02/35206 A2 | 5/2002 |
| WO | WO-2006/022587 A1 | 3/2006 |
| WO | WO-2008/086543 A2 | 7/2008 |
| WO | WO-2008086543 A2 * | 7/2008 .............. B01J 8/006 |

OTHER PUBLICATIONS

International Search Report and Written Opinion, International Application No. PCT/SE2016/050242, dated Jun. 1, 2016.
Office Action from Korean Application No. 10-2017-7030767 dated Jun. 16, 2020, with translation.

\* cited by examiner

BUBBLING FLUIDIZED BED COMBUSTION DEVICE AND METHOD FOR MONITORING THE FLUIDIZED BED IN SUCH A COMBUSTION DEVICE

FIELD OF THE INVENTION

The invention relates to the field of bubbling fluidized bed combustion devices, and in particular monitoring of the fluidized bed in such a device.

BACKGROUND

Bubbling fluidized bed combustion devices (BFB combustion devices) are well known in the art. BFB combustion devices may be used for example to provide water steam, and is then often termed a BFB boiler. A BFB combustion device is based on the principle that combustion takes place in a fluidized bed of solid particles. The bed is fluidized by penetrating the bed by fluid flowing vertically upwards with sufficient velocity to break up the bed. Fluidization of the bed is a central aspect of the combustion process in a BFB combustion device.

Consumption of bed material in bio fuel driven BFB combustion devices is often high, in some real world cases the entire bed is exchanged within two days. The bed material is exchanged at such rapid rate to be certain to avoid de-fluidization of the bed due to agglomeration of bed particles. This leads to high costs and high environmental impact. Sintering of the bed is another problem which may lead to substantial costs due to unwanted stops of the combustion device. Local sintering and agglomeration in the bed may further influence the flow of combustion air through the bed. Uneven distribution of the combustion air may lead to locally increased temperature which further increases sintering, and may also lead to increased NOx and CO emissions.

Devices for monitoring the fluidized bed are known. One such device involves measuring pressure difference over the bed height. The pressure difference is used together with other parameters to roughly estimate the bed height. This method has several disadvantages however. Besides being somewhat unreliable, rapid changes and oscillations in the bed are not detected, and the estimated bed height is only an average value for the whole bed.

Thus, there is a need for an improved system for monitoring the fluidized bed which is more accurate and is able to detect rapid changes.

JP2000042513 discloses a fluidized bed gasifying device comprising an ultrasound level detector arranged in the top of the furnace. The ultrasound detector is arranged to measure the distance to a stainless steel ball arranged on the surface of the fluidized bed. The ball moves in a vertical tube to maintain the ball at the correct position.

Although this system offers advantages over measurement devices based on the pressure difference principle, it will not be very accurate in a combustion device application due to the high temperature gradients therein which causes great variations of the speed sound and therefore inaccurate level measurements. Further, the steel ball and the vertical tube add complexity to the system and may suffer from reliability issues due to moving parts being in direct contact with the bed, possibly leading to jamming.

SUMMARY

An object of the present invention is to provide a bubbling fluidized bed combustion device having means for monitoring the fluidized bed, and also a method for monitoring the fluidized bed, which overcomes at least some of the disadvantages associated with the prior art described above.

These and other objects are achieved by the present invention by means of a bubbling fluidized bed combustion device and a method for monitoring a fluidized bed in a bubbling fluidized bed combustion device according to the independent claims. Preferred embodiments are defined in the dependent claims.

According to a first aspect of the invention, there is provided a bubbling fluidized bed combustion device comprising a fluidization vessel, a fluidized sand bed arranged in the fluidization vessel and an arrangement for monitoring the fluidized sand bed. The arrangement comprises at least one radar level gauge arranged to repeatedly measure a distance in the fluidization vessel from a reference point to at least one portion of the top surface of the fluidized sand bed, and to provide a measurement signal representative of the distance.

In other words, the bubbling fluidized bed combustion device is provided with at least one radar level gauge arranged in or at the fluidization vessel, for example through on opening in a top or side wall of the fluidization vessel. The at least one radar level gauge is arranged to measure the distance from a reference point, for example a position in said radar level gauge where microwave pulses, or frequency modulated continuous microwaves or unmodulated pulsed microwaves or a combination of both, are emitted, to at least one surface portion of the top surface of the fluidized sand bed. The distance may be measured vertically or essentially vertically, but may also be measured in any other direction provided that the radar level gauge has a free or undisrupted path to the top surface of the bed. The microwave pulses or microwaves transmitted from the radar level gauge are preferably reflected directly on the upper or top surface of the fluidized bed, i.e. no intermediate element is required to provide a sufficient reflection of the wave. The at least one radar level gauge is configured to provide a measurement signal representative of the distance, for example an analogue signal which scales with the distance between the reference point and the bed surface. The at least one radar level gauge is configured to measure the distance repeatedly, i.e. at more than one instance, for example measure the distance continuously or with one or more predetermined time intervals such as 6 times per minute, or with a predetermined rate. The predetermined rate may be between 6 times per minute to 60 times per minute, The combustion device may be configured to operate at a fluidized bed temperature range between 750-900° C. This temperature range is considered adequate for a good combustion rate of the fuel with minimized risk of sintering and agglomerating of the fluidized bed The invention is based on the insight that a radar level gauge may advantageously be used to monitor the fluidized bed in a bubbling fluidized bed combustion device, and in particular that such a radar level gauge may detect rapid changes in the fluidized bed. The invention is further based on the insight that a radar level gauge may measure a distance to the fluidized bed directly onto the top surface of the bed without any additional means for increasing the reflection on the bed surface, e.g. an intermediate member such as a ball arranged on the bed surface.

It is understood that radar level gauge refers to a microwave distance sensor which preferably is of the non-contact type provided with an antenna. Such a sensor can be arranged in or extending into the fluidization vessel at any suitable position, as long as the sensor has a free or undisrupted path to the top or upper surface of the fluidized bed. The radar level gauge may operate within a frequency range between 35 GHz to 100 GHz, preferably 50 GHz to 80 GHz. It is also understood that bubbling fluidized bed refers to a bed of sand or solid particles which is fluidized by being penetrated by a fluid which flows at or slightly above the minimum velocity required to break up or fluidize the bed, thereby forming bubbles in the bed but still maintaining a stable bed. The fluid which penetrates the fluidized bed may flow with a velocity between 0.6 m/s to 1.5 m/s which is above the minimum velocity to break up of the bed. The fluid may comprise oxygen for the combustion of the fuel to take place in the fluidized bed.

According to an embodiment of the device according to the first aspect of the invention, the arrangement further comprises evaluation means configured to repeatedly, e.g. continuously or with predetermined time interval(s) or with a predetermined rate, determine a bed state parameter based on the signal, the state parameter being one or at least one of the distance, a level of the fluidized sand bed or a height of the fluidized sand bed. The predetermined rate may be between 6 times per minute to 60 times per minute, The level (of the top surface of the bed) and the height of the bed may be determined based on the signal and known geometric properties of the fluidization vessel.

The evaluation means may furthermore be configured to repeatedly, e.g. continuously or with predetermined time interval(s) or with a predetermined rate, determine a variation of the bed state parameter including determining an amplitude and/or a frequency of the variation based on current and previously determined bed state parameter values. The predetermined rate may be between 6 times per minute to 60 times per minute, The evaluation means may furthermore be configured to repeatedly, e.g. continuously or with predetermined time interval(s) or with a predetermined rate, store data in a memory, the data including at least one of the determined bed state parameter, the determined amplitude and the determined frequency. The above described determination of a variation of the bed state parameter may be based at least partly on bed state parameter values stored in said memory. The predetermined rate may be between 6 times per minute to 60 times per minute, The evaluation means may furthermore be configured to repeatedly, e.g. continuously or with predetermined time interval(s) or with a predetermined rate, apply a diagnostic algorithm to at least a sub set the stored data to determine if the fluidized sand bed comprises agglomerated or sintered sand particles. The predetermined rate may be between 6 times per minute to 60 times per minute, The diagnostic algorithm may include determining if the determined frequency is changing over time (based on stored frequency values), and if so indicate that the fluidized sand bed comprises agglomerated or sintered sand particles. In particular, the diagnostic algorithm may include determining if the determined frequency is decreasing over time, and if so indicate that the fluidized sand bed comprises agglomerated or sintered sand particles.

The bubbling fluidized bed combustion device may in embodiments furthermore comprise gas supply means arranged to supply gas to fluidize the sand bed, fuel supply means arranged to supply fuel to the sand bed, and feedback control means. The feedback control means are arranged to control the gas supply means and/or the fuel supply means based on at least one of the determined bed state parameter, the determined frequency and the determined amplitude in order to control combustion in the sand bed.

According to a second aspect of the invention, there is provided a method for monitoring a fluidized bed in a bubbling fluidized bed combustion device comprising a fluidization vessel, a fluidized sand bed arranged in the fluidization vessel. The method comprises providing at least one radar level gauge in or at the fluidization vessel, and repeatedly measuring a distance in the fluidization vessel from a reference point to at least one portion of the top surface of the fluidized sand bed using the radar level gauge.

The above comments regarding the first aspect of the invention and embodiments thereof apply analogously to the second aspect of the invention.

In an embodiment of the method according to the second aspect of the invention, the method further comprises repeatedly, e.g. continuously or with predetermined time interval(s) or with a predetermined rate, determining a bed state parameter based on a measurement signal from the radar level gauge being representative of the distance, the state parameter being one or at least one of the distance, a level of the fluidized sand bed or a height of the fluidized sand bed. The predetermined rate may be between 6 times per minute to 60 times per minute, The method may further comprise repeatedly, e.g. continuously or with predetermined time interval(s) or with a predetermined rate, determining a variation of the bed state parameter including determining an amplitude and/or a frequency of the variation based on current and previously determined bed state parameter values. The method may further comprise repeatedly, e.g. continuously or with predetermined time interval(s) or with a predetermined rate, storing data in a memory, the data including at least one of the determined bed state parameter, the determined amplitude and the determined frequency. The predetermined rate may be between 6 times per minute to 60 times per minute, The above described determining of a variation of the bed state parameter may be based at least partly on bed state parameter values stored in said memory.

The method may further comprise applying a diagnostic algorithm to at least a sub set the stored data to determine if the fluidized sand bed comprises agglomerated or sintered sand particles. The diagnostic algorithm may include determining if the determined frequency is changing over time (based on stored frequency values), and if so indicate that the fluidized sand bed comprises agglomerated or sintered sand particles. In particular, the diagnostic algorithm may include determining if the determined frequency is decreasing over time, and if so indicate that the fluidized sand bed comprises agglomerated or sintered sand particles.

BRIEF DESCRIPTION OF THE DRAWINGS

These and other aspects of the present invention will now be described in more detail with reference to the appended drawings, which show presently preferred embodiments of the invention, wherein.

DETAILED DESCRIPTION

Figure 1:
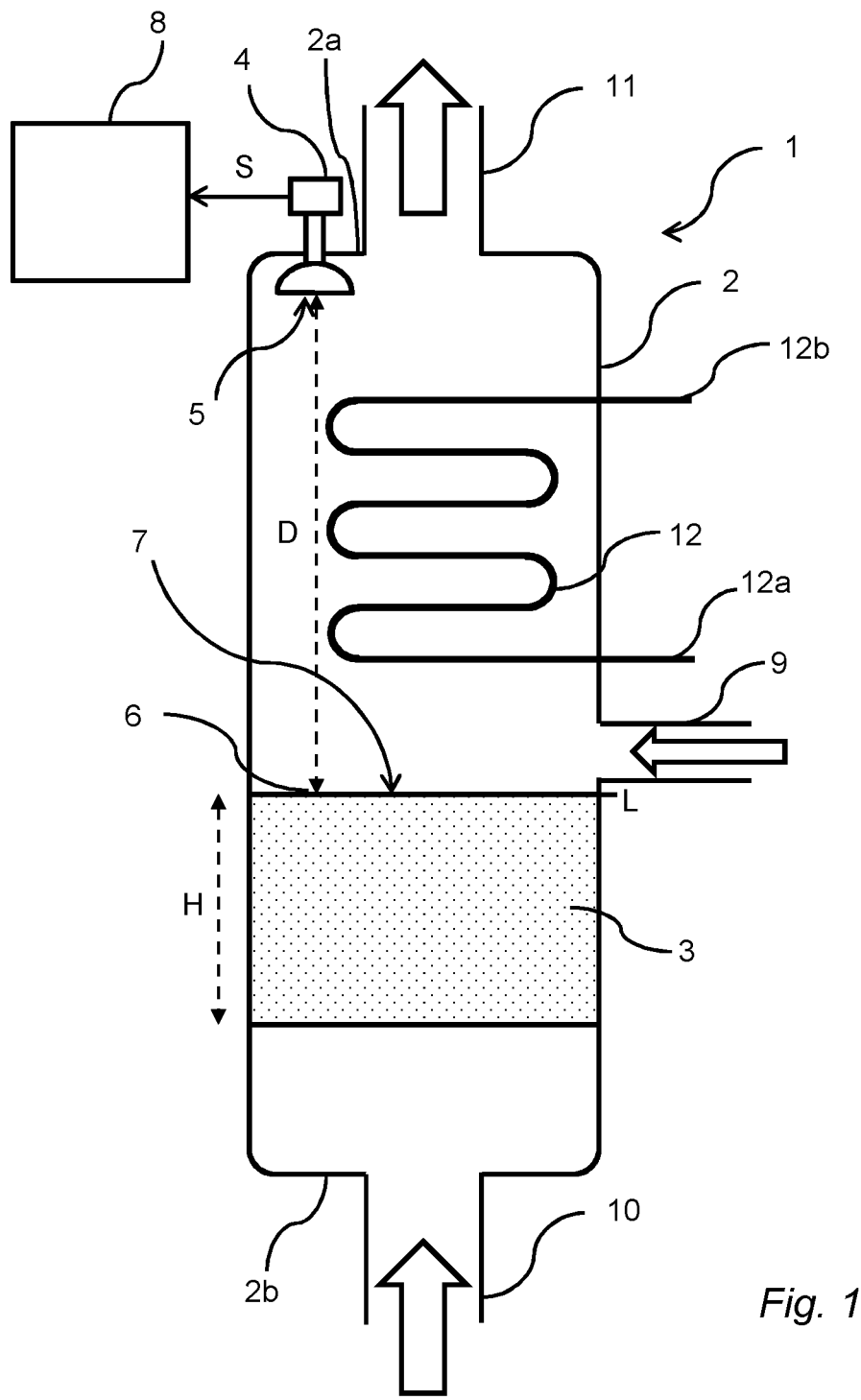
FIG. 1 shows a schematic illustration of an embodiment of a bubbling fluidized bed combustion device according to the first aspect of the invention.

FIG. 1 shows a schematic illustration of an embodiment of a bubbling fluidized bed combustion device 1 according the first aspect of the invention. The bubbling fluidized bed combustion device 1 comprises a fluidization vessel 2, a fluidized sand bed 3 arranged in the fluidization vessel, and an arrangement for monitoring the fluidized sand bed. The arrangement comprises a radar level gauge 4 and evaluation means 8.

The fluidization vessel 2 is a cylindrical container and is provided with a gas inlet or gas supply means 10 configured to communicate gas from below to the bed 3 at a sufficient velocity (for example within the range 0.6 m/s to 1.5 m/s) such that the bed is fluidized. The bed 3 comprises solid particles or sand, which may be silicate sand. In the figure, the gas supply means is connected to the interior of the fluidization vessel through a bottom end or surface thereof, but may in other embodiments have different physical shapes and positions, as long as the desired effect is achieved, i.e. to fluidize the bed 3. The gas comprises oxygen for the combustion of the fuel to take place in the fluidized bed.

The fluidization vessel is also provided with an exhaust gas outlet 11 arranged to evacuate exhaust gas from the fluidization vessel generated from combustion in the bed 3. In the figure, the exhaust gas outlet is connected to the interior of the fluidization vessel 2 through an upper end or surface 2a thereof, but may in other embodiments have different physical shapes and positions, as long as the desired effect is achieved, i.e. to evacuate generated exhaust gas.

The fluidization vessel is furthermore provided with fuel supply means 9 configured to communicate fuel to the fluidized bed 3. The fuel supply means 9 is arranged above the upper surface 7 of the bed, such that fuel is added to the bed from above. In the figure, the fuel supply means is connected to the interior of the fluidization vessel through a side surface thereof, but may in other embodiments have different physical shapes and positions, as long as the desired effect is achieved, i.e. to provide fuel to the fluidized bed. The fuel is combusted in the fluidized bed at a temperature between 750-900° C.

A water heating conduit 12 is provided in the fluidization vessel 2 above the bed 3, and is provided with an inlet 12a for water and an outlet 12b for heated water or water steam. The water heating conduit 12 functions as a heat exchanger wherein water entering the conduit is heated or evaporated by heat from hot exhaust gas (originating from combustion in the bed 3) which rises upwards towards the exhaust gas outlet 11. The bubbling fluidized bed combustion device in FIG. 1 may thus be referred to as a bubbling fluidized bed boiler.

The radar level gauge 4 is arranged through the upper end surface 2a of the fluidization vessel, and is arranged to measure a distance D in the fluidization vessel from a reference point 5 to at least one surface portion 6 of the top surface 7 of the fluidized sand bed. The radar level gauge is provided with an antenna, for example of the parabolic type, directed downwards towards the bed. The surface portion 6 is typically only a few square centimeters of size. The radar level gauge has a small angle of dispersion, for example 4 degrees. To provide a better measure of the fluidization of the entire bed, several radar level gauges may be used arranged to measure distance to different surface portions of the top surface of the bed. In other embodiments, the radar level gauge 4 may be arranged through a side wall or surface of the fluidization vessel. In this embodiment, the radar level gauge operates within a frequency range between 50-80 GHz.

The radar level gauge 4 provides a measurement signal S representative of the distance D. The radar level gauge is electrically connected to the evaluation means 8 to communicate the measurement signal S thereto. When the radar level gauge performs a measurement, frequency modulated continuous microwaves or pulses containing microwaves of electromagnetic radiation or a combination of both are transmitted from the radar level gauge in a direction towards the bed 3 and are reflected on the top surface 7 of the bed back to the antenna. In the figure, the path of the microwave beam or pulses is illustrated by the vertical dotted line shown in the figure, but it is understood that the measurements do not have to be performed vertically. The reference point in this embodiment is the position in the radar level gauge where the microwaves or microwave pulses are emitted (or received).

As will be discussed below in more detail with reference to FIG. 2, the radar level gauge 4 is configured to measure the distance repeatedly, i.e. at more than one instance, for example measure the distance continuously or with one or more predetermined time intervals, or with a predetermined rate, such as 6 times per minute. The evaluation means 8 is configured to repeatedly, e.g. continuously or with predetermined time interval(s) or with a predetermined rate, which may be between 6 to 60 times per minute, process the signal S and determine a bed state parameter, an amplitude and a frequency of a variation thereof and apply a diagnostic algorithm. This will also be discussed in more detail below with reference to FIG. 2.

In another embodiment of the device, which comprises all features of the embodiment described above with reference to FIG. 1, the device furthermore comprises feedback control means arranged to control said gas supply means 10 and/or said fuel supply means 9 based on at least one of the determined bed state parameter, the determined frequency and the determined amplitude in order to control combustion in said sand bed. For this purpose, the gas supply means may further include an electrically controllable blower or the like which allows the gas flow to be adjusted, and the fuel supply means may further include an electrically controllable pump or the like which allows the fuel flow to be adjusted. Alternatively, the gas supply means and fuel supply means may be provided with valves or throttles which allow respective incoming flows to be throttled. The feedback control means may be a separate physical unit, for example an electronic control unit (ECU), or may be implemented in the evaluating means or in another existing processing unit in or at the device.

Figure 2:
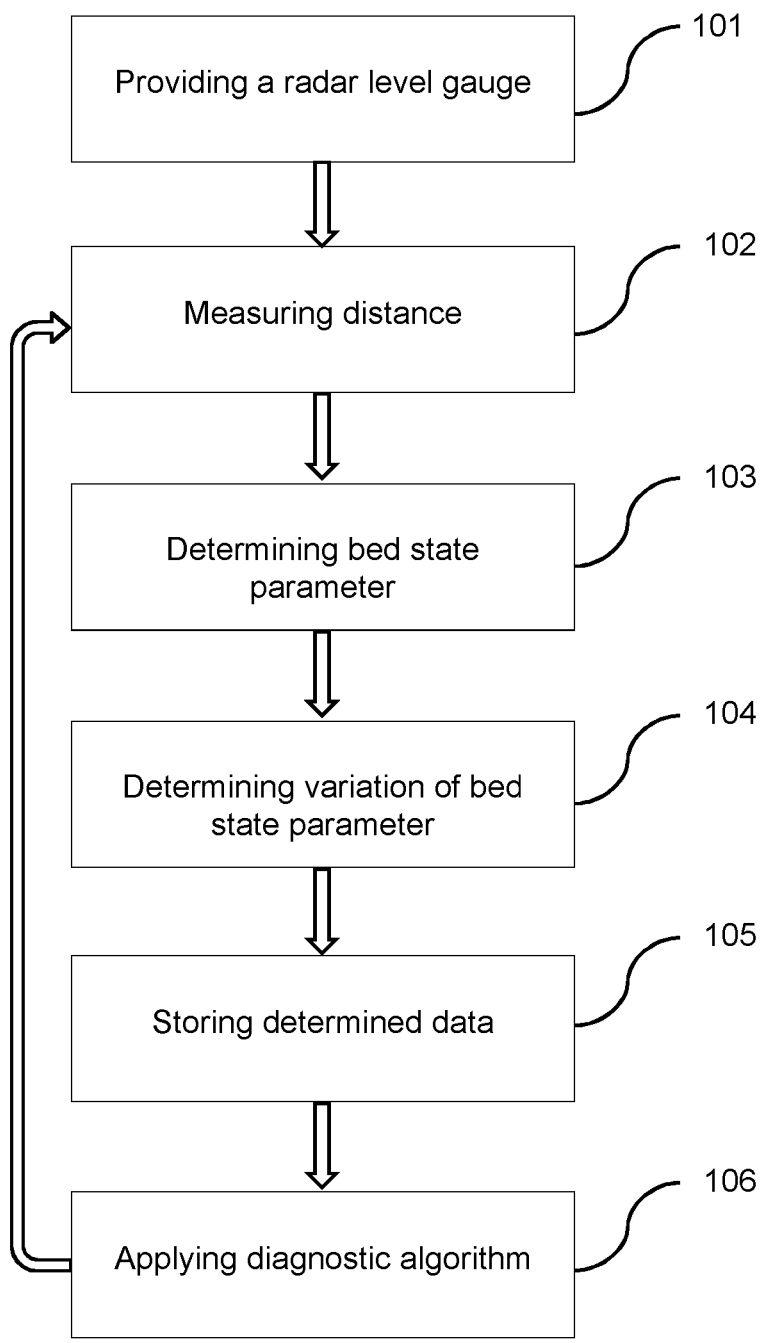
FIG. 2 shows a flow chart of an embodiment of a method according to the second aspect of the invention.

FIG. 2 shows a flow chart of an embodiment of a method according to the second aspect of the invention. The method is for monitoring a fluidized bed in a bubbling fluidized bed combustion device comprising a fluidization vessel, a fluidized sand bed arranged in the fluidization vessel, for example according to the embodiment shown in FIG. 1.

The first step 101 of the method comprises providing at least one radar level gauge in or at the fluidization vessel.

In step 102, a distance in the fluidization vessel from a reference point to at least one portion of the top surface of the fluidized sand bed is measured using the radar level gauge.

In step 103, a bed state parameter is determined based on a measurement signal from the radar level gauge being representative of the distance. The bed state parameter being determined is one of the distance, a level of the fluidized sand bed or a height of the fluidized sand bed.

In step 104, a variation of the bed state parameter is determined based on the bed state parameter value determined in step 103 and at least one previously determined bed state parameter value. The at least one previously determined bed state parameter value has, in a previous iteration of the method loop, been stored in a memory in step 105, see below.

In step 105, data is stored in a memory. The data includes the determined bed state parameter, the determined amplitude and the determined frequency.

In step 106, a diagnostic algorithm is applied to at least a sub set the data stored in the memory to determine if the fluidized sand bed comprises agglomerated or sintered sand particles. The diagnostic algorithm includes determining if the determined frequency is changing over time (based on stored frequency values).

After step 106, the method returns to step 102 to once again measure the distance. In this manner, the method steps 102-106 are repeated with predetermined time interval(s) or with a predetermined rate. The memory will thus contain time resolved values of the bed state parameter, the amplitude and the frequency, i.e. values determined at each instant the method steps 102-106 are performed. The predetermined rate may be between 6 times per minute to 60 times per minute.

The description above and the appended drawings are to be considered as non-limiting examples of the invention. The person skilled in the art realizes that several changes and modifications may be made within the scope of the invention. For example the fluidization vessel does not necessarily have to be cylindrical, and the evaluation means may be separate from the actual bubbling fluidized bed combustion device or may be included as software in another processing means. The scope of protection is determined by the appended patent claims.

The invention claimed is:

1. A bubbling fluidized bed combustion device comprising
   a fluidization vessel;
   a fluidized sand bed arranged in said fluidization vessel; and
   an arrangement for monitoring said fluidized sand bed, said arrangement comprising at least one microwave radar level gauge arranged to repeatedly measure a distance in said fluidization vessel from a reference point to at least one portion of the sand at the top surface of the fluidized sand bed, by transmitting microwave pulses or microwaves which are reflected directly off the sand at the top surface of the fluidized sand bed without aid of another reflection member, and to provide a measurement signal representative of said distance.

2. The bubbling fluidized bed combustion device according to claim 1, wherein said arrangement further comprises a processing unit configured to repeatedly determine a bed state parameter based on said signal, said state parameter being one of said distance, a level of said fluidized sand bed or a height of said fluidized sand bed.

3. The bubbling fluidized bed combustion device according to claim 2, wherein the processing unit is configured to repeatedly determine a variation of said bed state parameter including determining an amplitude and/or a frequency of said variation based on current and previously determined bed state parameter values.

4. The bubbling fluidized bed combustion device according to claim 3, wherein the processing unit is configured to repeatedly store data in a memory, said data including at least one of the determined bed state parameter, the determined amplitude and the determined frequency.

5. The bubbling fluidized bed combustion device according to claim 4, wherein the processing unit is configured to apply a diagnostic algorithm to at least a sub set of said stored data to determine if said fluidized sand bed comprises agglomerated or sintered sand particles, wherein said diagnostic algorithm includes determining said frequency and if said determined frequency is changing over time, and if so indicate that said fluidized sand bed comprises agglomerated or sintered sand particles.

6. The bubbling fluidized bed combustion device according to claim 3, further comprising:
   gas supply means arranged to supply gas to fluidize said sand bed;
   fuel supply means arranged to supply fuel to said sand bed; and
   feedback control means arranged to control said gas supply means and/or said fuel supply means based on at least one of the determined bed state parameter, the determined frequency and the determined amplitude in order to control combustion in said sand bed.

7. The bubbling fluidized bed combustion device according to claim 1, wherein the combustion device is configured to operate at a temperature between 750-900° C.

8. The bubbling fluidized bed combustion device according to claim 1, wherein said at least one microwave radar level gauge is configured to operate within a frequency range of 35-100 GHz.

9. The bubbling fluidized bed combustion device according to claim 8, wherein said at least one microwave radar level gauge is configured to operate within a frequency range of 50-80 GHz.

10. A method for monitoring a fluidized bed in a bubbling fluidized bed combustion device according to claim 1 comprising the fluidization vessel, the fluidized sand bed arranged in said fluidization vessel,
    and the at least one microwave radar level gauge, the method comprising
    repeatedly measuring a distance in said fluidization vessel from a reference point to at least one portion of the sand at the top surface of the fluidized sand bed using said at least on microwave radar level gauge by transmitting microwave pulses or microwaves which are reflected directly off the sand at the top surface of the fluidized sand bed without aid of another reflection member.

11. The method according to claim 10, further comprising repeatedly determining a bed state parameter based on a measurement signal from said radar level gauge being representative of said distance, said state parameter being one of said distance, a level of said fluidized sand bed or a height of said fluidized sand bed.

12. The method according to claim 11, further comprising repeatedly determining a variation of said bed state parameter including determining an amplitude and/or a frequency of said variation based on current and previously determined bed state parameter values.

13. The method according to claim 12, further comprising repeatedly storing data in a memory, said data including at least one of the determined bed state parameter, the determined amplitude and the determined frequency.

14. The method according to claim 13, further comprising applying a diagnostic algorithm to at least a sub set of said stored data to determine if said fluidized sand bed comprises agglomerated or sintered sand particles, said diagnostic algorithm including determining if said determined frequency is changing over time, and if so indicating that said fluidized sand bed comprises agglomerated or sintered sand particles.

15. The method according to claim 10, wherein said bubbling fluidized bed combustion device further comprises gas supply means arranged to supply gas to fluidize said sand bed and fuel supply means arranged to supply fuel to said sand bed, said method further comprising controlling combustion in said fluidized sand bed by controlling said gas supply means and/or said fuel supply means based on at least one of the determined bed state parameter, the determined frequency and the determined amplitude.

16. The method according to claim 10, further comprising operating the combustion device at a temperature between 750-900° C.

17. The method according to claim 10, wherein said at least one microwave radar level gauge operates within a frequency range of 35-100 GHz.

18. The method according to claim 17, wherein said at least one microwave radar level gauge operates within a frequency range of 50-80 GHz.

19. A method for monitoring a fluidized bed in a bubbling fluidized bed combustion device according to claim 1 comprising the fluidization vessel, the fluidized sand bed arranged in said fluidization vessel, and the at least one microwave radar level gauge, and the device further comprising gas supply means arranged to supply gas to fluidize said sand bed, and fuel supply means arranged to supply fuel to said sand bed, said method comprising
- operating the at least one microwave radar level gauge within a frequency range of 35-100 GHz;
- repeatedly measuring a distance in said fluidization vessel from a reference point to at least one portion of the sand at the top surface of the fluidized sand bed using said at least one microwave radar level gauge by transmitting microwave pulses or microwaves which are reflected directly off the sand at the top surface of the fluidized sand bed without aid of another reflection member;
- repeatedly determining a bed state parameter based on a measurement signal from said at least one microwave radar level gauge being representative of said distance, said state parameter being one of said distance, a level of said fluidized sand bed, or a height of said fluidized sand bed;
- repeatedly determining a variation of said bed state parameter including determining an amplitude and a frequency of said variation based on current and previously determined bed state parameter values;
- repeatedly storing data in a memory, said data including at least one of the determined bed state parameter, the determined amplitude, and the determined frequency;
- applying a diagnostic algorithm to at least a subset of said stored date to determine if said fluidized sand bed comprises agglomerated or sintered sand particles, said diagnostic algorithm including determining if said determined frequency is changing over time, and if so indicating that said fluidized sand bed comprises agglomerated or sintered sand particles;
- controlling combustion in said fluidized sand bed by controlling said gas supply means and/or said fuel supply means based on at least one of the determined bed state parameter, the determined frequency and the determined amplitude; and
- operating the combustion device at a temperature between 750-900° C.

20. A bubbling fluidized bed combustion device comprising
- a fluidization vessel;
- a fluidized sand bed arranged in said fluidization vessel; and
- an arrangement for monitoring said fluidized sand bed, said arrangement comprising at least one microwave radar level gauge arranged to repeatedly measure a distance in said fluidization vessel from a reference point to at least one portion of the sand at the top surface of the fluidized sand bed, by transmitting microwave pulses or microwaves which are reflected directly off the sand at the top surface of the fluidized sand bed, and to provide a measurement signal representative of said distance,
wherein the processing unit is configured to repeatedly determine a variation of said bed state parameter including determining an amplitude and/or a frequency of said variation based on current and previously determined bed state parameter values.

21. The bubbling fluidized bed combustion device according to claim 20, wherein the processing unit is configured to repeatedly store data in a memory, said data including at least one of the determined bed state parameter, the determined amplitude and the determined frequency.

* * * * *